(12) United States Patent
Tillman

(10) Patent No.: US 8,647,104 B1
(45) Date of Patent: Feb. 11, 2014

(54) DOUGH CUTTER APPARATUS AND METHOD OF USE

(75) Inventor: Ron Tillman, Smithville, MO (US)

(73) Assignee: Quiktrip Corporation

( * ) Notice: Subject to any disclaimer, the term of this patent is extended or adjusted under 35 U.S.C. 154(b) by 354 days.

(21) Appl. No.: 12/607,886

(22) Filed: Oct. 28, 2009

(51) Int. Cl.
*A21C 11/10* (2006.01)

(52) U.S. Cl.
USPC ........... 425/298; 425/235; 425/237; 425/294; 425/316; 425/362; 426/503; 426/518

(58) Field of Classification Search
USPC ......... 425/235, 237, 287, 289, 290, 292, 294, 425/298, 299, 316, 332, 335, 336, 362, 363, 425/436 R, 510; 426/496, 497, 503, 518, 426/549; 83/113, 114, 115, 116, 117, 118, 83/123, 128, 150, 176, 932
See application file for complete search history.

(56) References Cited

U.S. PATENT DOCUMENTS

| | | | |
|---|---|---|---|
| 1,945,755 A | | 2/1934 | Scruggs |
| 2,007,768 A * | | 7/1935 | Olevin ............................. 30/306 |
| 3,225,718 A * | 12/1965 | Page .............................. 425/101 |
| 4,075,359 A * | 2/1978 | Thulin ........................... 426/502 |
| 4,276,800 A * | 7/1981 | Koppa et al. ..................... 83/863 |
| 4,469,476 A * | 9/1984 | Cavanagh et al. ............ 425/216 |
| 4,606,716 A * | 8/1986 | McCaffrey ..................... 425/289 |
| 4,625,612 A * | 12/1986 | Oliver ............................. 83/863 |
| 4,792,299 A * | 12/1988 | McCaffrey ..................... 425/289 |
| 4,865,862 A * | 9/1989 | McFeaters et al. ........... 426/496 |
| 4,881,889 A * | 11/1989 | Spiel et al. ..................... 425/383 |
| 5,063,839 A * | 11/1991 | McFeaters et al. ............. 99/353 |
| 5,297,947 A * | 3/1994 | Cardinali ....................... 425/194 |
| 5,388,489 A * | 2/1995 | Dayley ............................ 83/117 |
| 5,529,799 A * | 6/1996 | Bornhorst et al. ............ 426/549 |
| 5,534,281 A * | 7/1996 | Pappas et al. ................. 426/383 |
| 5,635,500 A * | 6/1997 | Akagi et al. ................... 514/203 |
| 6,004,612 A * | 12/1999 | Andreski et al. .............. 426/618 |
| 6,902,754 B1 * | 6/2005 | Evans et al. ................... 426/503 |
| 6,953,596 B2 * | 10/2005 | Maniak et al. ................. 426/503 |
| 7,442,026 B2 * | 10/2008 | Shulski et al. ................ 425/237 |
| 7,914,834 B2 * | 3/2011 | Fu et al. ........................ 426/503 |

* cited by examiner

*Primary Examiner* — Seyed Masoud Malekzadeh
(74) *Attorney, Agent, or Firm* — McAfee & Taft

(57) ABSTRACT

The present invention relates to a dough cutter for cutting a plurality of dough products from a dough sheet. The dough products are cut from the dough sheet into a defined geometrical shape and provide for easy pull-apart pastries once they are baked, cooked, or fried. The dough cutter consists of a plurality of dies, each containing a plurality of inner geometric cutouts.

16 Claims, 4 Drawing Sheets

DOUGH CUTTER APPARATUS AND METHOD OF USE

BACKGROUND OF THE INVENTION

This invention relates generally to pastry items and methods for manufacturing pastry items. Additionally, this invention relates to a dough cutter device that creates geometrically themed pastry dough shapes having separable/severable cutouts.

Pastries are a popular food item in grocery stores, convenience stores, doughnut shops, state and county fairs, and other venues. These pastries are usually sold as a single serving. When several pastries are desired, the consumer must purchase multiple, separate pastries.

Some pastries are produced by placing several individual pastries together prior to frying or baking them. This approach grew from the desire to provide a grouping of pastries in a single package that allows the consumer to pull the pastries apart. Creating these "pull-apart" pastries is a difficult task. Most of these pastries are made by cutting out several smaller dough pieces and placing them together in a pan. This creates the illusion of a pull-apart type of pastry. Unfortunately, this approach is labor intensive and fails to provide for a pastry with multiple cutout pieces connected by a pull-apart web of dough.

It is desirable to provide pastries grouped together in a true pull-apart form that are capable of being packaged in a single package. It is also desirable to provide the pull-apart pastries in a variety of geometric shapes such as trapezoids, squares, circles, triangles, pentagons, octagons, semi-circles, four point stars, five point stars, six point stars, cartoon characters, and nearly any other possible geometric shape. Unfortunately, the industry lacks the ability to produce these geometrically themed pull-apart dough shapes in an automated manner using the currently available rotary or planar dough cutters.

A need exists for a dough cutter that is capable of generating large quantities of dough shapes for pull-apart pastries. Furthermore, a need exists for the dough cutter to be compatible with automation.

SUMMARY OF THE INVENTION

The invention provides an apparatus and method for creating a pull-apart dough pastry.

In one embodiment, a rotary dough cutter is provided. The rotary dough cutter is a cylinder with an outer surface. There are at least one outwardly projecting guide rim attached to the outer surface. The outer surface also carries a plurality of outwardly projecting circumferentially attached dies. Each die further includes an outer wall circumscribing each of the dies. The outer wall defines a die geometric shape and a depth of the die. The outer wall is capable of cutting dough in a shape defined by the die geometric shape. There are a plurality of inner geometric cutouts positioned within the outer wall. Each of the plurality of inner geometric cutouts abuts an adjacent inner geometric cutout. There are a plurality of cutout walls defining a shape for each of the inner geometric cutouts. Each cutout wall abuts an adjacent cutout wall. Each abutment forms a gap therebetween. The cutout walls have a depth substantially similar to the outer wall depth. Finally, the dies include a separator defined by the cutout walls.

In another embodiment, a rotary dough cutter is provided. The rotary dough cutter has a cylinder with a guide rim affixed thereto and outward projecting therefrom. There are a plurality of dies circumferentially attached to and outwardly projecting from the cylinder. Each of the dies has an outer wall surrounding it. The outer wall defines a shape and depth of the die. A plurality of inner geometric cutouts are positioned within the outer wall. A plurality of cutout walls defines the shape for each of the inner geometric cutouts. The cutout wall provides the point of abutment for each inner geometric cutout. The cutout wall has a depth substantially similar to the depth of the outer wall. There are a plurality of separators defined by the cutout walls.

In another embodiment, the invention provides a method for creating a pull-apart dough based product. The inventive method comprises the steps of:
  (a) placing the dough on a flat surface;
  (b) forming a dough sheet having a length;
  (c) placing the dough sheet on a conveyor belt;
  (d) moving said dough sheet under said rotary dough cutter using said conveyor belt, wherein said rotary dough cutter rotates as said length of said dough sheet contacts said rotary dough cutter;
  (e) applying sufficient pressure to cause said rotary dough cutter to contact said conveyor belt, thereby creating a plurality of dough shapes having a thin connective web, said rotary dough cutter having:
    (i) a cylinder having an outer surface;
    (ii) at least one guide attached near an end of the cylinder and projecting radially outward, said guide positioned to orient said cylinder on said conveyor belt;
    (iii) a plurality of dies circumferentially attached to and outwardly projecting from the outer surface, each die including:
      (1) an outer wall defining the dough shape and being capable of separating the dough sheet into portions of dough matching the dough shapes, wherein the outer wall defines a depth of the die;
      (2) a plurality of inner geometric cutouts circumscribed by the outer wall;
      (3) a plurality of cutout walls connected to the outer wall and forming the inner geometric cutouts within the outer wall, the cutout walls being arranged with at least one surface abutting an adjacent cutout wall, the abutments defining a gap therebetween, wherein the cutout walls have a depth substantially similar to the depth of the die;
      (4) a separator defined by and positioned between the abutments and cutout walls
      (5) wherein the gap creates a thin web of dough as a defined separation line;
  (f) cooking the dough shapes; and
  (g) serving the dough shapes as the pull-apart dough based product.

Numerous objects and advantages of the invention will become apparent as the following detailed description of the preferred embodiments is read in conjunction with the drawings which illustrate such embodiments.

DETAILED DESCRIPTION

Figure 1:
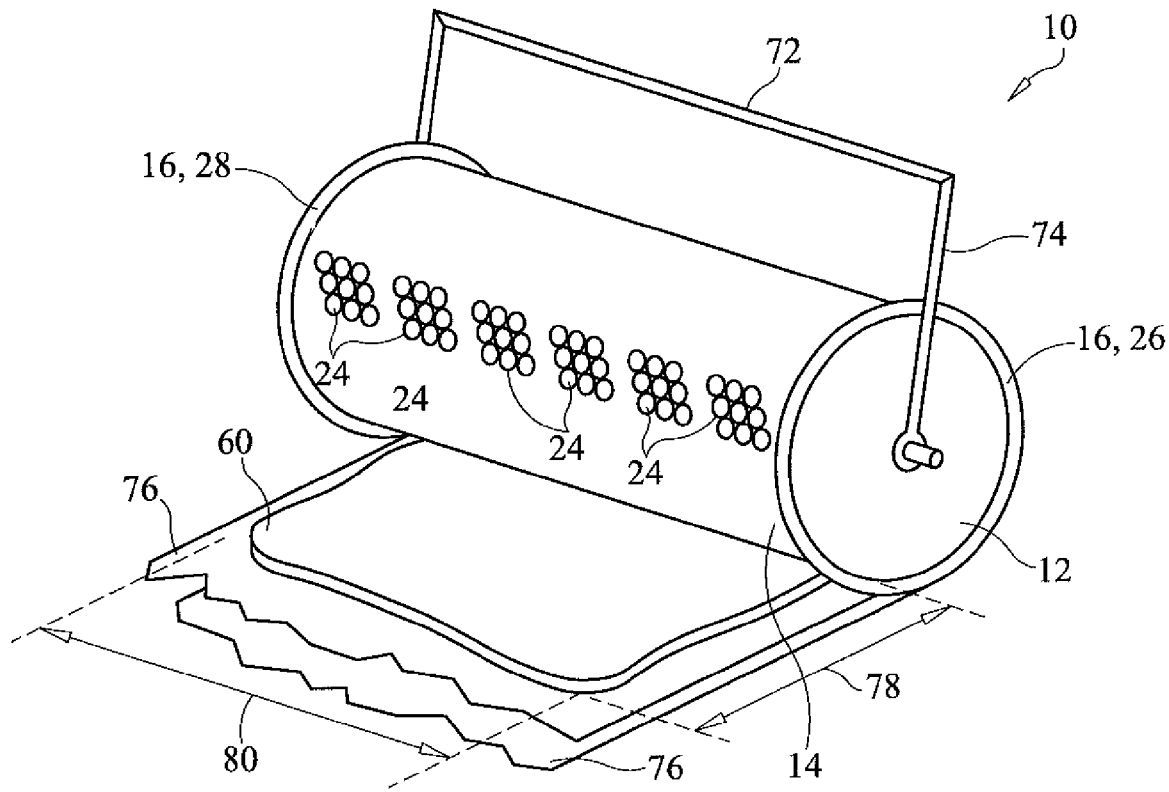
FIG. 1 depicts a perspective view of a dough cutter.

The dough cutter described herein will be describes with reference to a doughnut dough cutter to facilitate understanding of the invention. But, the dough cutter can be any pastry dough cutter used to create pull-apart pastries as disclosed herein. A non-limiting list of other examples may include pie crusts, rolls, croissants, cookies, bread, etc.

As used herein, the term "die" refers to the cutting element used to create a single pull-apart pastry having a plurality of smaller pastries connected together with a thin web of dough. The term "inner geometric cutout" refers to the cutting element used to create one of the smaller pastries having a geometric shape and connected together with the thin web of dough. The term "separator" refers to the resulting area positioned between each of the inner geometric cutouts. The terms "connective web space" or "gap" refer to a small opening positioned between abutting adjacent "inner geometric cutouts" defining the space for creating the connective piece of dough between the "inner geometric cutouts."

Referring to the drawings, the dough cutter is illustrated and generally designated by the numeral 10. As shown by the drawings and understood by those skilled in the art, dough cutter 10 and components thereof are associated with separation of a plurality of cutouts from a dough sheet by using the dies positioned on dough cutter 10.

Figure 2:
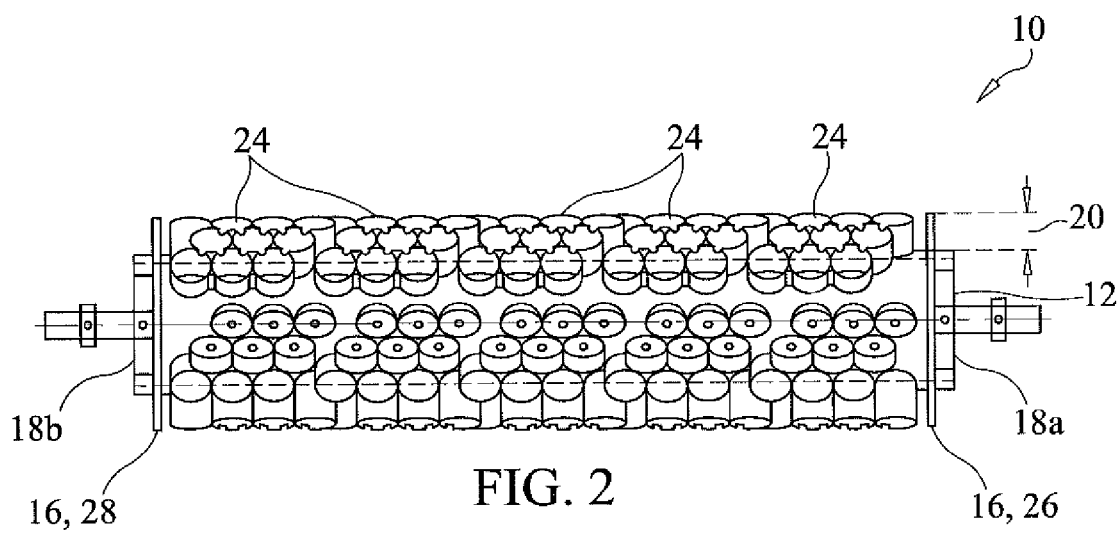
FIG. 2 depicts a front view of a dough cutter.
Figure 3:
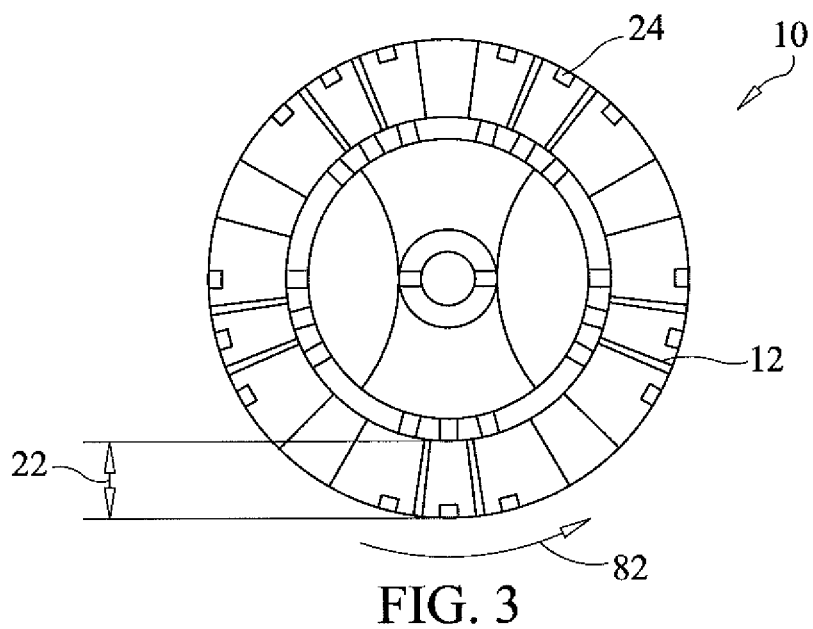
FIG. 3 depicts a section side view of a dough cutter taken from FIG. 2 along lines 3-3.

Regarding FIGS. 1-3, dough cutter 10 has tube or cylinder 12. Cylinder 12 is shown having an outer surface 14 and at least one guide rim 16. Outer surface 14 of cylinder 12 has at least one guide rim 16 located near edge 18*a* or 18*b*. Projecting radially outward from surface 14, guide rim 16 defines depth 20. Preferably, guide rim 16 has sufficient depth 20 to align cylinder 12 during use and as described below. Alternatively, guide rim 16 has depth 20 equal to depth 22 of die 24 to provide a standoff distance between a flat surface (not shown) and outer surface 14.

In the doughnut dough cutter example depicted in FIGS. 1-7, preferably, there are at least two guide rims 16 utilized. First guide rim 26 is positioned near first outer edge 18*a* of cylinder 12, and second guide rim 28 is positioned near second outer edge 18*b* of cylinder 12.

Figure 6:
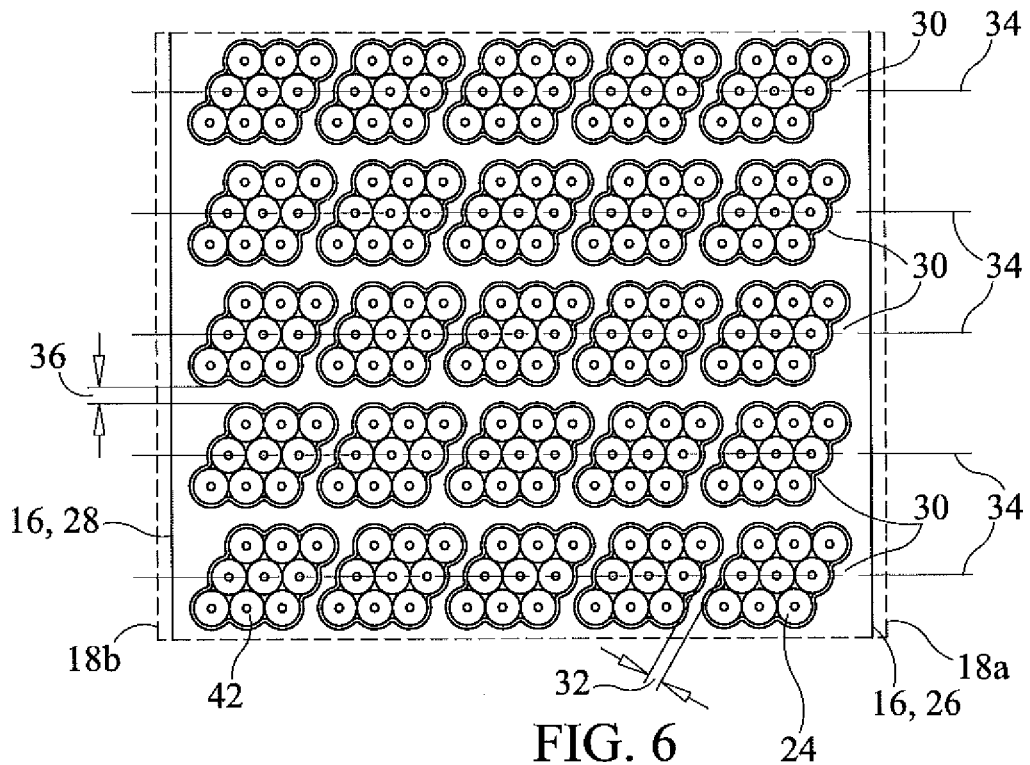
FIG. 6 depicts a plan view of a die of a dough cutter laid out flat.

In the preferred embodiment, surface 14 carries a plurality of circumferentially attached dies 24. FIG. 6 depicts the preferred embodiment wherein a plurality of outwardly projecting dies 24 form a plurality of rows 30.

Referring to FIG. 6, dies 24 in each row 30 are preferably positioned and aligned to maximize the number of dies 24 in each row while minimizing space 32 between each die 24. In a preferred embodiment, space 32 is about 0.4 inches (10 millimeters). Each row 30 has row centerline 34. Row centerline 34 is separated from an adjacent row 30 by distance 36. In a preferred embodiment, distance 36 is about 3.75 inches (95 millimeters). But, distance 36 is a design parameter defined by: (a) the size of cylinder 12; (b) the desired separation space 32 desired between each die 24; and, (c) the acceptable volume of waste dough.

Dies 24 may be manufactured from metals or ceramics. Preferably, dies 24 have a non-stick surface. If the material properties of die 24 do not inherently have a non-stick property, a non-stick coating is applied either during manufacturing of die 24 or during dough cutting operations.

Die 24 has outer wall 38 defining die shape 40 of the pull-apart pastry. In the example shown in FIGS. 1-7, outer wall 38 has a geometrically shaped die shape 40 that is a trapezoidal. However, die 24 may be any geometric shape.

Each die 24 defines a plurality of inner geometric cutouts 42 and separators 44. Each of the plurality of inner geometric cutouts 42 are defined by cutout walls 46. Additionally, each of the plurality of inner geometric cutouts 42 are positioned within and circumscribed by outer wall 38.

Inner geometric cutouts 42 have a plurality of cutout walls 46 with interstitial abutments 48 providing the point of abutment 50 between each adjacent inner geometric cutout 42. Preferably, each inner geometric cutout 42 abuts at least one other inner geometric cutout 42. At point of abutment 50, the abutting inner geometric cutouts 42 may be affixed to each other by welding, gluing, soldering, or other methods known to those skilled in the art.

Figure 4:
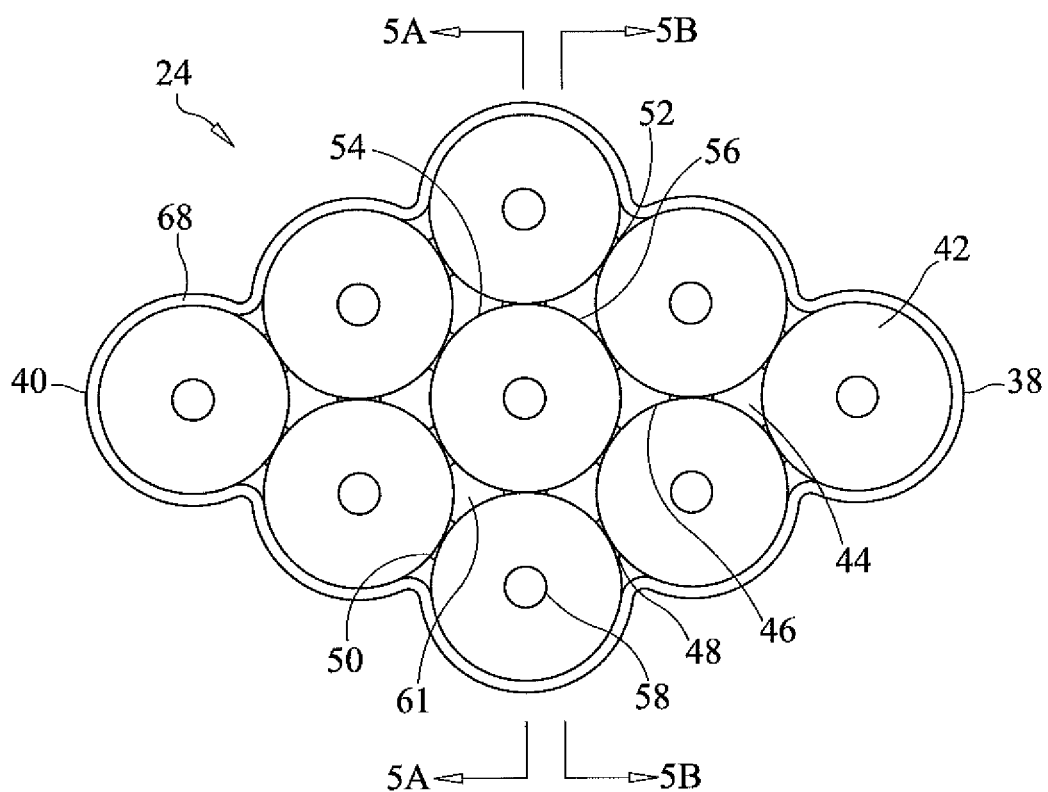
FIG. 4 depicts a plan view of the dies of a dough cutter.
Figure 7:
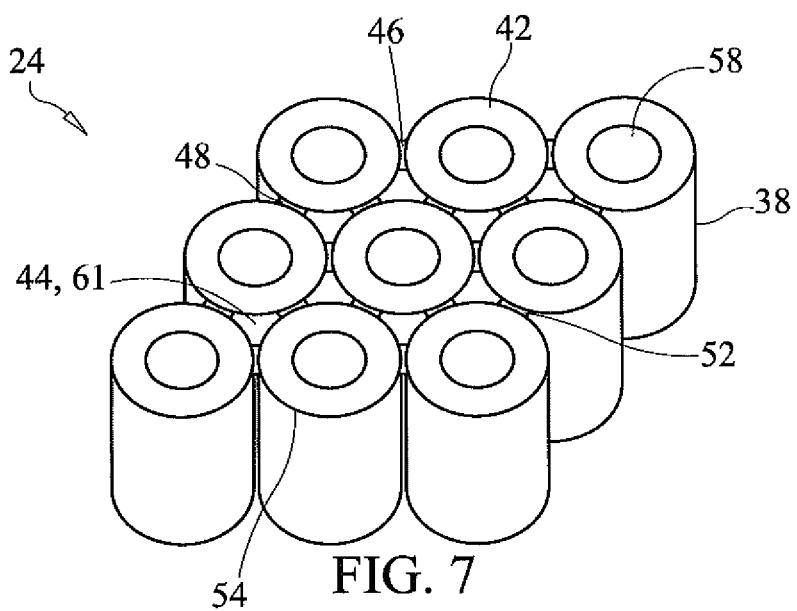
FIG. 7 depicts a perspective view of a dough cutter die.

Interstitial abutments 48 and corresponding points of abutment 50 define connective web space, or gap 52 between adjacent inner geometric cutouts 42. As depicted in FIGS. 4 and 7, gap 52 is formed from cutout wall 46. Preferably, gap 52 is about 0.25 inches (6 millimeters) across and about 0.125 inches (3 millimeters) below cutting edge 54 of cutout wall 46. Thus, gap 52 provides for and defines the connective web of dough for each pastry connecting each pull-apart pastry.

Cutout walls 46 define cutout shape 56 of inner geometric cutout 42, As shown in FIGS. 1-7, inner geometric cutouts 42 are circular. However, the inner geometric cutouts 42 can be any shape and have any number of inner geometric cutouts 42. As shown in the doughnut example, cutout wall 46 has a thickness of about 0.03 inches (1 millimeter), outer wall 38 has a thickness of about 0.08 inches (2 millimeters).

Referring to a preferred embodiment shown in FIG. 4, nine inner geometric cutouts 42 are shown. It is preferred that each die 24 include at least three inner geometric cutouts 42.

In the doughnut example, optional hole-like cutter 58 is positioned within each inner geometric cutout 42 to create annular pastries, or pastries having a hole or penetrating portion removed prior to cooking. As shown in FIGS. 4 and 7, hole-like cutter 58 is centrally positioned. Hole-like cutter 58 provides for the removal and extraction of dough from within each of inner geometric cutouts 42 as die 24 is pressed into dough sheet 60.

As shown, hole-like cutter 58 is circular, but it can be any shape or plurality of shapes. Other shapes can be created by the addition of other cutting devices. For example, hole-like cutter 58 can be removed or repositioned to change the shape of inner geometric cutouts 42. Another example is to have a shape, or plurality of shapes such as stars, internally added to inner geometric cutout 42 to create a pastry with designs or shapes. Additionally, hole-like cutter 58 is reconfigurable to only remove a portion of dough from dough sheet 60 so as to create a design on the pastry.

Referring to FIGS. 4, 5A, 5B and 7, separators 44 are defined by cutout walls 46 of inner geometric cutouts 42. Alternatively, separators 44 are defined by cutout walls 46 of inner geometric cutouts 42 and interstitial abutments 48. In the doughnut example depicted in FIG. 4, separators 44 are triangularly shaped. Preferably, separators 44 have solid surface 61 that is outwardly positioned on separator 44. Separators 44 and solid surface 61 must form an area designed to force dough of dough sheet 60 towards inner geometric cutouts 42 and/or gap 52.

Referring to FIGS. 1-5B and 7, each die 24 has several cutting surfaces creating the pull-apart pastry. Die 24 has two different depths further defining the pull-apart pastry. The different cutting surfaces of die 24 include a main cutting surface 62 of outer wall 38 and cutting edge 54 of cutout wall 46. Cutting edge 54 defines the edges of separator 44 and solid surface 61. For the doughnut example, hole-like cutter 58 is added as a cutting surface 64 and is positioned within the area defined by cutout walls 46 that form inner geometric cutout 42, so as to create the plurality of annular pastries or doughnuts.

Figure 5A:
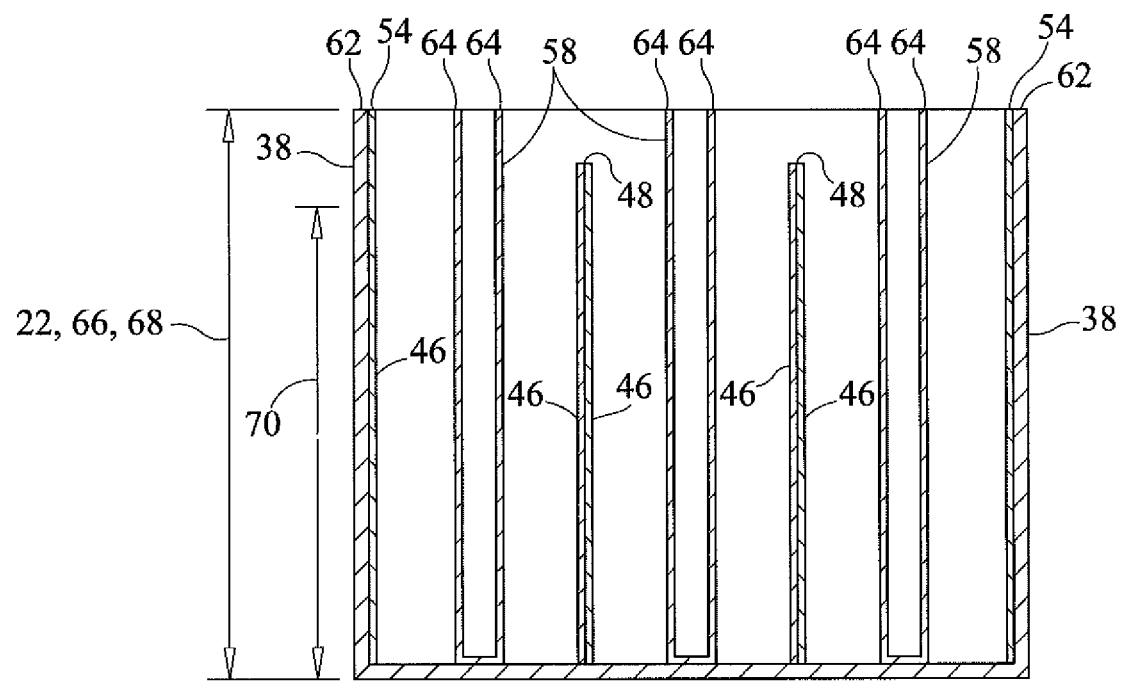
FIG. 5A depicts the sectional side view taken from FIG. 4 along lines 5A-5A.
Figure 5B:
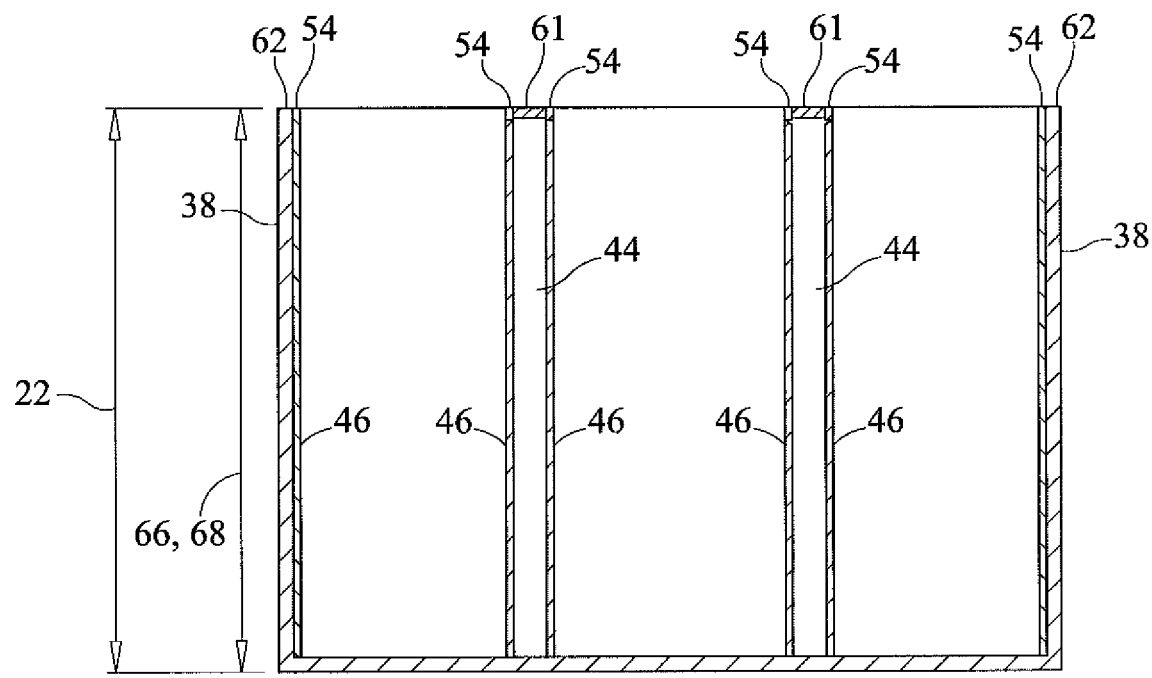
FIG. 5B depicts the sectional side view taken from FIG. 4 along lines 5B-5B.

Referring to FIGS. 5A and 5B, outer wall 38 defines depth 22 of die 24 and for dough cutter 10. Cutout walls 46 and solid surface 61 of separators 44 have depth 66. Depth 66 is substantially similar to or equal to depth 22. Preferably, hole-like cutter 58 has a depth 68 that is also substantially similar to depth 22 of die 24. Interstitial abutment 48 has depth 70. Depth 70 must be less than depth 66, thereby defining the depth of gap 52, which is positioned between adjacent inner geometric cutouts 42. In a representative example depicted in FIGS. 3-5B, depth 22, depth 66 and depth 68 are about 1 inch (25 millimeters). Depth 70 is about 0.125 inches (3 millimeters) less than depth 22, depth 66 and depth 68, or about 0.875 inches (22 millimeters).

Referring to FIG. 1, crossbar 72 carries trunions 74, which support cylinder 12. In a preferred embodiment, cross bar 72 is connected to an automated machine controlling the cutting process. In an alternative embodiment, cross bar 72 has a handle for manual operations.

During operations using dough cutter 10 a dough sheet is created using common means. Dough sheet 60 is formed by placing it on a flat surface (not shown) and spreading it out. For automated processes, dough sheet 60 is placed on conveyor belt 76 in preparation for making geometrically themed dough shapes. After being formed, dough sheet 60 has length 78 and width 80. Dough sheet 60 can also be formed directly on conveyor belt 76, and it can be formed from a nearly continuous sheet of dough. For manual processes, dough sheet 60 is placed on a flat surface (not shown).

In the preferred automated embodiment, dough cutter 10 is positioned over dough sheet 60, which is located on conveyor belt 76. FIG. 1 depicts guide rim 16 aligning cylinder 12 with conveyor belt 76 and positioned over dough sheet 60. Dough cutter 10 is automatically raised and lowered using cross bar 72 and a mechanical system (not shown). As conveyor 76 moves, dough sheet 60 passes under cylinder 12, whereby cylinder 12 rotates in direction 82 as a result of dies 24 making contact with dough sheet 60. In this preferred embodiment, cylinder 12 has rotational movement in direction 82 and positioning movement associated with the mechanical system.

When a manual process is utilized, dough cutter 10 is manually translated over dough sheet 60 with guide 18 providing a standoff distance between dough sheet 60 and cylinder 12. In this embodiment, cylinder 12 has rotational movement in direction 82 and linear movement along length 78 of dough sheet 60.

Once the plurality of geometrically themed dough shapes are cut from dough sheet 60, they are cooked by baking or frying. Additional steps of preparation can occur, such as glazing or icing the finished product. The geometrically themed dough shapes are now pastries ready to be sold. These pastries may be sold the same day or be packaged for later consumption. When being served, the pastries are severed along the thin connective web of dough that is created by gap 52, thereby creating a pull-apart dough-based pastry.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:

1. A rotary dough cutter comprising:
a cylinder having an outer surface;
at least one outwardly projecting guide rim attached to said outer surface;
a plurality of dies circumferentially attached to and outwardly projecting from said outer surface, wherein each of said dies is configured to create a single pull-apart pastry having a plurality of smaller pastries connected together with a web of dough formed from a plurality of connecting pieces of dough such that each said smaller pastry is connected by said web to at least two other of said smaller pastries and each of said dies includes:
an outer wall circumscribing each of said dies, said outer wall defining a die geometric shape and a depth of each of said dies, wherein said outer wall is capable of cutting a dough in a shape defined by said die geometric shape;
a plurality of inner geometric cutouts positioned within said outer wall wherein each of said inner geometric cutouts is configured to create one of said smaller pastries;
a plurality of cutout walls defining a shape for each of said inner geometric cutouts, wherein each of said cutout walls abuts an adjacent cutout wall, each abutment defining a gap therebetween, wherein said cutout walls have a depth substantially similar to said outer wall depth and the gap includes an opening positioned between abutting adjacent cutout walls and defines a space for creating one of the plurality of connecting pieces of the web of dough; and
a plurality of separators defined by said cutout walls wherein said plurality of separators form an area configured to force dough towards the inner geometric cutouts and the gap.

2. The rotary dough cutter of claim 1, wherein each of said dies has at least three inner geometric cutouts.

3. The rotary dough cutter of claim 1, further comprising at least one hole-like cutter positioned within each of said inner geometric cutouts.

4. The rotary dough cutter of claim 1, wherein each of said cutout walls has a cutting edge and each of said separators further have a solid surface defined by said cutting edge and said formed area, said solid surface outwardly positioned and having a substantially similar depth to said cutout walls.

5. The rotary dough cutter of claim 1, wherein said guide rim has a depth greater than said depth of said dies.

6. The rotary dough cutter of claim 5, further comprising a conveyor belt designed to carry a dough sheet, wherein said cylinder is positionable across said conveyor belt and said guide rim is capable of aligning said cylinder with said conveyor belt.

7. The rotary dough cutter of claim 1, wherein said plurality of dies are arranged in a plurality of rows on said cylinder.

8. A rotary dough cutter comprising:
a cylinder having a guide rim affixed thereto and outwardly projecting therefrom;
a plurality of dies circumferentially attached to and outwardly projecting from said cylinder, wherein each of said dies is configured to create a single pull-apart pastry having a plurality of smaller pastries connected together with a web of dough formed from a plurality of connecting pieces of dough such that each said smaller pastry is connected by said web to at least two other of said smaller pastries;
an outer wall surrounding each of said dies, said outer wall defining a shape and a depth of said dies;

a plurality of inner geometric cutouts positioned within said outer wall wherein each of said inner geometric cutouts is configured to create one of said smaller pastries;

a plurality of cutout walls defining a shape for each of said inner geometric cutouts, said cutout walls providing points of abutment for each inner geometric cutout, wherein said cutout walls have a depth substantially similar to said outer wall; and a gap defined at each point of abutment between said inner geometric cutouts, wherein each gap has a depth less than said depth of said cutout walls and the gap defines a space for creating one of the plurality of connecting pieces of the web of dough; and a plurality of separators defined by said cutout walls wherein said plurality of separators form an area configured to force dough towards the inner geometric cutouts and the gap.

9. The rotary dough cutter of claim 8, wherein said guide rim is positioned near at least one of two outer edges of said cylinder.

10. The rotary dough cutter of claim 9, wherein said guide rim further comprises a first and a second guide rim, wherein said first guide rim is positioned near a first outer edge of said cylinder, and said second guide rim is positioned near a second outer edge of said cylinder.

11. The rotary dough cutter of claim 8, further comprising at least one hole-like cutter positioned within each of said inner geometric cutouts.

12. The rotary dough cutter of claim 8, wherein said cylinder is rotatably supported by a pair of trunions attached thereto.

13. The rotary dough cutter of claim 12, wherein said trunions are attached to a cross-bar, said cross-bar connecting said trunions and having a handle for manual operation.

14. The rotary dough cutter of claim 12, wherein said trunions are attached to a cross-bar, said cross-bar connecting said trunions and connected to a mechanically operated dough rolling device.

15. The rotary dough cutter of claim 8, wherein said plurality of dies are arranged in a plurality of rows on said cylinder 16. The rotary dough cutter of claim 8, wherein each of said cutout walls has a cutting edge and each of said separators further have a solid surface defined by said cutting edge and said formed area, said solid surface outwardly positioned and having a substantially similar depth to said cutout walls.

* * * * *